United States Patent [19]

Pearson et al.

[11] 4,258,830
[45] Mar. 31, 1981

[54] RAILWAY BRAKE SYSTEM UTILIZING SLACK ADJUSTER IN COMPRESSION

[75] Inventors: Arthur C. Pearson; Robert A. Sieg, both of St. Charles, Mo.

[73] Assignee: ACF Industries, Inc., New York, N.Y.

[21] Appl. No.: 51,936

[22] Filed: Jun. 25, 1979

[51] Int. Cl.³ ............................................. F16D 65/62
[52] U.S. Cl. ...................................... 188/52; 188/198
[58] Field of Search ............... 188/52, 53, 153 R, 198, 188/203

[56] References Cited

U.S. PATENT DOCUMENTS

| | | | |
|---|---|---|---|
| 3,177,984 | 4/1965 | Taylor | 188/52 X |
| 3,442,358 | 5/1969 | Mersereau | 188/52 X |
| 4,128,148 | 12/1978 | Schmitt | 188/52 X |

*Primary Examiner*—Duane A. Reger

*Attorney, Agent, or Firm*—Henry W. Cummings

[57] ABSTRACT

The brake cylinder piston at its outer end is connected to a horizontal brake lever extending transversely of the car, which is connected generally at its mid-point to a first brake beam. The opposite end of the horizontal lever is connected to a first end of a slack adjuster which extends longitudinally and parallel to the brake cylinder. The opposite end of the slack adjuster is connected to a first end of a second horizontal lever. The opposite end of the second horizontal lever opposite the slack adjuster is fulcrumed to a fixed portion of the car. After the first brake beam engages its railway wheels, further outward movement of the piston rod pivots the first horizontal lever about this pivot point and moves the slack adjuster longitudinally of the car and in turn pivots the second horizontal lever about its fulcrum point.

8 Claims, 8 Drawing Figures

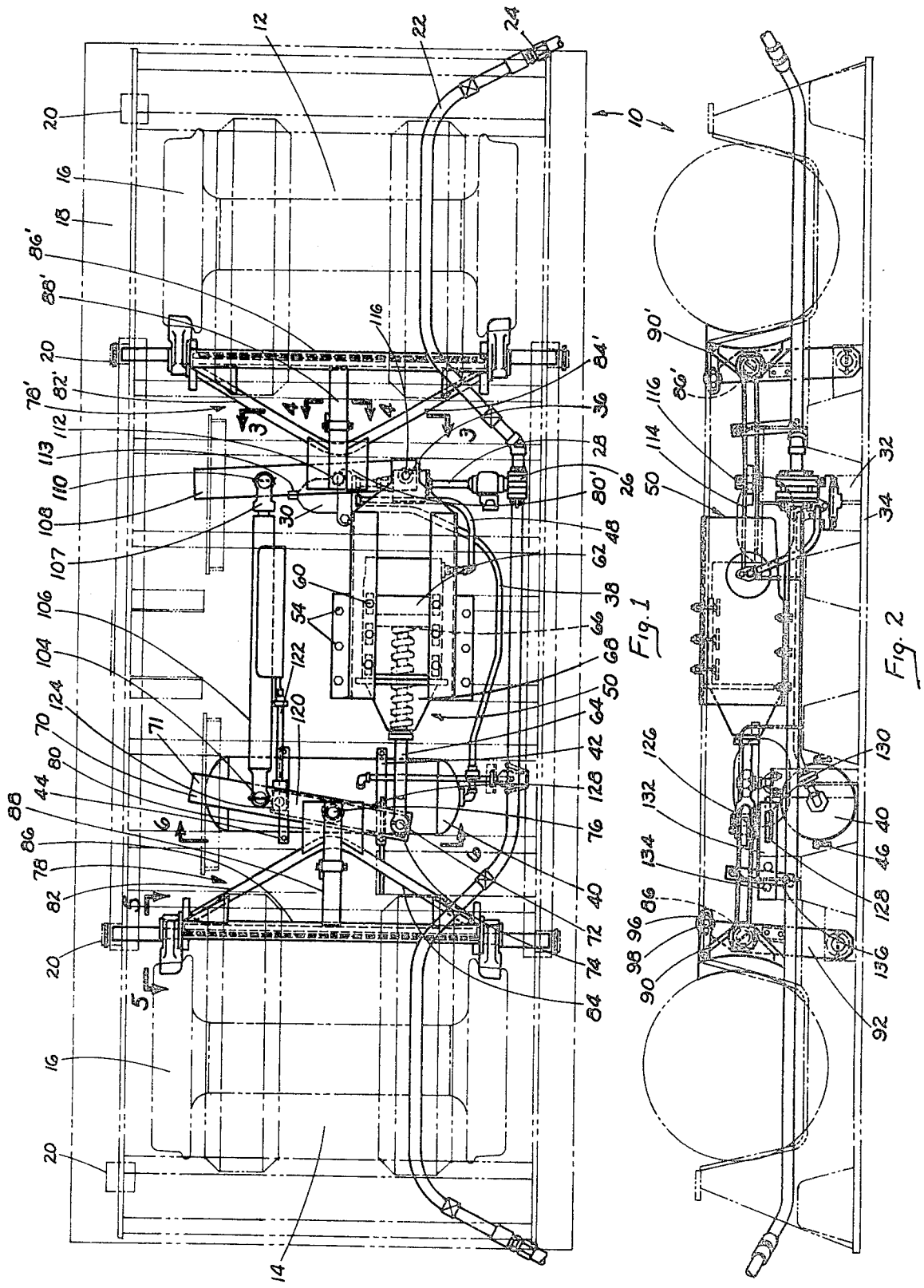

RAILWAY BRAKE SYSTEM UTILIZING SLACK ADJUSTER IN COMPRESSION

BACKGROUND OF THE INVENTION

This invention relates to a brake system for a railway car.

In U.S. Pat. No. 3,487,963 (1970), a two-axle railway mine car is disclosed having a bottom hinged at one side and in which the bottom pivots about the hinge to allow discharge of the lading from one side of the car.

One brake system utilized on these cars includes a spring loaded brake which is applied when air pressure is evacuated from an air cylinder opposing the spring force.

This system is not compatible with the standard American AAR brake system and locomotive control, in which pressure reductions in the locomotive control valve cause brake application in each car in the train.

Furthermore, lack of clearance to replace brake shoes has been a problem with this system.

The object of the present invention is to provide a railway brake system applicable to two-axle mine cars and to conventional two-axle freight car trucks which is compatible with the standard AAR brake system and locomotive control of application of the brakes by reduction in the brake line at the locomotive control valve.

U.S. Pat. Nos. 3,406,794 and 3,442,358 disclose the use of a cylinder and a piston connected to a horizontal lever for applying railway brakes in a first direction and a slack adjuster extending in a direction opposite to the piston travel to apply the brakes in a second direction.

SUMMARY OF THE INVENTION

In a railway car brake system, the train line is connected to a triple valve. The triple valve is in fluid communication with a reservoir and a brake cylinder. The reservoir is also in fluid communication with the brake cylinder. The brake cylinder is fixedly mounted on the car and includes a piston movable within the cylinder. The piston at its outer end is connected to a horizontal brake lever extending transversely of the car, which is connected generally at its mid-point to a first brake beam. When pressure in the brake line is lowered, the triple valve shifts and air pressure from the reservoir moves the piston outwardly which moves the horizontal lever longitudinally and moves the brake beam shoes into engagement with the railway wheels. When the brake beam engages the wheels, the horizontal lever is fulcrumed at its mid-point connection to the brake beam. The opposite end of the horizontal lever is connected to a slack adjuster which extends longitudinally and generally parallel to the brake cylinder. The opposite end of the second horizontal lever, opposite the slack adjuster, is fulcrumed to a fixed portion of the car. After the first brake beam engages its railway wheels, further outward movement of the piston rod pivots the first horizontal lever about this pivot point and moves the slack adjuster longitudinally of the car, and in turn pivots the second horizontal lever about its pivot point. This moves the second brake beam longitudinally in a direction opposite to the movement of the piston rod to cause the second brake beam to engage its wheels. When the pressure is increased in the brake line to a specified level, the triple valve again shifts. The pressure in the brake cylinder is vented to the atmosphere and the reservoir is again charged with air pressure.

The brake application force can be controlled by the pressure drop applied to the train line. The greater the pressure drop in the train line, the greater the applied pressure in the brake cylinder and the greater the applied brake pressure to the wheels.

A special horizontally extending slack adjuster lever is also connected to the first brake beam with a vertical pin and, at its opposite end, to a slack adjuster control rod. The slack adjuster lever slides within a slot in a vertically extending fulcrum bracket. When the brake shoes have worn to some extent, the slack adjuster lever bottoms out in the fulcrum bracket. However, the longitudinal movement of the first horizontal lever pivots the slack adjuster lever about the slack adjuster pin to apply tension to the slack adjuster control rod.

The brake beams are horizontally extending and are supported for longitudinal horizontal movement by a U-shaped support. The brake shoes are free to rotate about a horizontal, tubular axis and are adjustable, depending upon wear, through a vertical support.

THE DRAWINGS

FIG. 1 is a plan view of the brake system of the present invention;

FIG. 2 is a side elevation of the brake system of the present invention;

DESCRIPTION OF PREFERRED EMBODIMENTS

Figures 3, 4, 5:
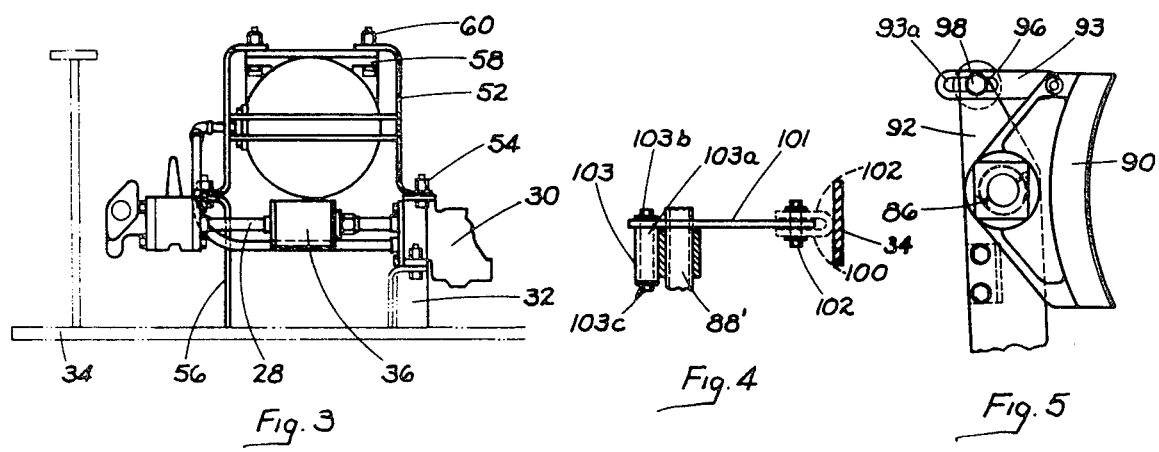
FIG. 3 is a view looking in the direction of the arrows along the line 3—3 in FIG. 1.
FIG. 4 is a view looking in the direction of the arrows along the line 4—4 in FIG. 1 and rotated 90° with the car body removed for clarity.
FIG. 5 is a sectional view looking in the direction of the arrows along the line 5—5 in FIG. 1.
Figure 6:
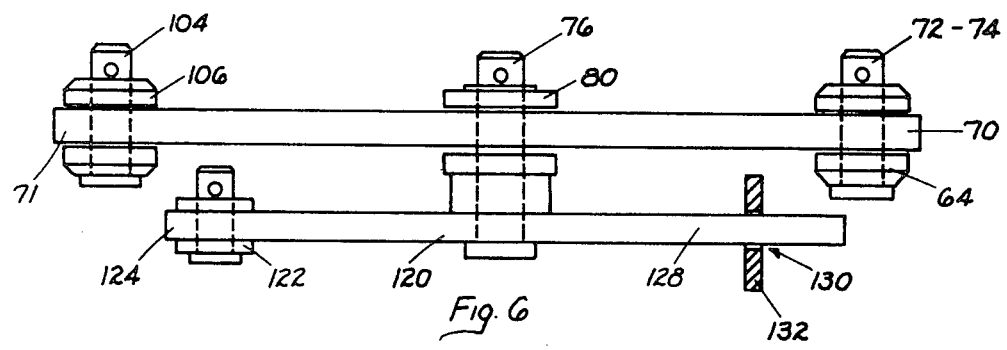
FIG. 6 is a view looking in the direction of the arrows along the line 6—6 in FIG. 1.
Figure 7:
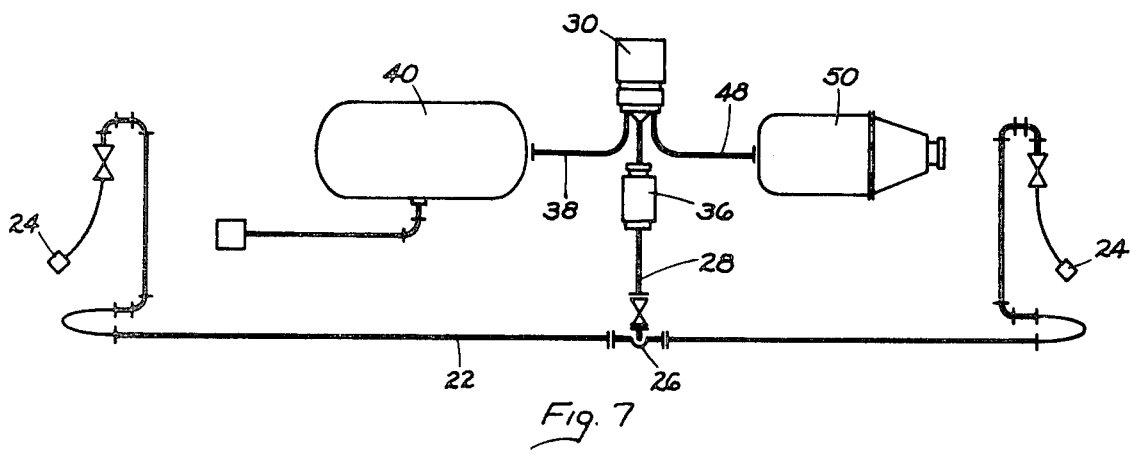
FIG. 7 is a piping schematic diagram of the brake system of the present invention.

A railway freight car is indicated in the drawings generally at 10. This railway car includes a pair of axles 12 and 14 connected to respective wheels 16. In the particular application chosen for illustration the railway car is a mine car constructed according to the teachings of U.S. Pat. No. 3,487,963 granted Jan. 6, 1970 hereby incorporating into the present application by this reference. This mine car includes a side sill 18 upon which are mounted hinges 20 to allow the bottom to drop away from the car body to unload the lading through the opposite side as described in the '963 patent.

The brake system for the car includes a trainline 22 having a standard trainline connection 24 adapted to connect the brake line to a brake line in an adjacent car and to the brake line control system in a railway locomotive. The brake line 22 includes a BPT 26 in which a conduit branch 28 connects the brake system to conventional triple valve 30. See for example "DD Freight Brake Equipment Instruction Pamphlet No. 5075", March 1963, Westinghouse Air Brake Company; Air Brake Division, Wilmerding, Pa. 15148. (Copy in application file). Triple valve 30 is mounted upon a bracket 32 supported on a deck 34 (FIG. 3). In line 28 a strainer 36 is provided to protect the triple valve from impurities in the train line. The triple valve is in fluid communication by means of a first conduit 38 with a reservoir 40 located longitudinally inboard of the triple valve. Reservoir 40 is held in place with straps 42 connected with fasteners 44 to vertical support plates 46.

Triple valve 30 is further in fluid communication through a conduit 48 with a brake cylinder 50. Cylinder 50 is held in place with a bracket 52 (FIG. 3) held in place with fasteners 54 in engagement with the triple valve mounting bracket 32 and a laterally spaced bracket 56 also welded to the deck 34. The cylinder 50 includes a mounting flange 58 which is held in engagement with U-shaped bracket 52 by means of fasteners 60.

The construction of cylinder 50 is conventional and includes a movable cup 62. A piston rod 64 has a piston head 66 movable within the cylinder 50. As is well known in the art, introduction of air pressure through conduit 48 into cylinder 50 moves cup 62 and piston and rod 64 from right to left in FIG. 1. A spring 68 biases the piston rod into a non-extended position within the cylinder 50.

Piston rod 64 is connected to a horizontally extending transverse lever 70 by means of a pin 72 and a cotter 74. In the mid-portion of the horizontal lever 70 a pin 76 connects the horizontal lever to a brake beam assembly 78 including a brake beam extension 80. Brake beam assembly 78 includes a pair of brake beam arms 82 and 84 and a tubular horizontal shaft 86. A center arm 88 connects the brake beam extension 80 with the shaft 86. The brake shoes 90 are rotatable about the shaft 86 and include an extension 93 having a slot 93a. The brake shoes are movable back and forth relative to a vertical support 92 having a slot 96 and a removable fastener 98. See FIG. 5.

As shown in FIG. 4, a U-shaped bracket 100 is welded to the deck 34 and is connected to a vertically extending support 101 by a pin 102. A guide 103 is connected to the upper end of support 101 by a pin 103a and cotters 103b and 103c. Guide 103 provides a guide for the center arm 88 moving between engaged and disengaged positions of the brake beam.

At the opposite end of horizontal lever 70 a vertical pin 104 connects the horizontal lever with a slack adjuster indicated at 106. Suitable slack adjusters are commercially available. See, for example, U.S. Pat. Nos. 3,406,794 and 3,442,358, hereby incorporated into the present application by this reference. A specific example of a suitable slack adjuster is Ellcon National Model Number 7100-101. Further information concerning the construction of this slack adjuster can be found in these patents and in Ellcon National brochure entitled "Double Acting Automatic Slack Adjuster", Bulletin 7100-101, 30 King Road, Totowa, N.J. 07512 (copy available in the application file).

The opposite end 107 of the slack adjuster 106 is connected to a second horizontal lever 108 by means of a vertical pin 110. Horizontal lever 108 is connected to a brake beam assembly 78' including a brake beam extension 80' with a vertical pin 112. The construction of brake beam assembly 78' is similar to brake beam assembly 78 including horizontal arms 82', 84', center arm 88' and horizontal tube 86'. Horizontal lever 108 is fulcrumed to a bracket 114 extending outwardly from the brake cylinder 50 by means of a vertical pin 116. Thus horizontal lever 108 is fulcrumed at this end. Brake shoes 90' are again mounted about horizontal tube 86'.

Reduction in the trainline pressure 22 from a locomotive causes the triple valve 30 to be in fluid communication with the reservoir 40 through the conduit 38. From the triple valve air pressure goes through the conduit 48 into the brake cylinder 50. The air pressure moves the cup 62 and the piston head 66 and piston 64 from right to left in FIG. 1. This in turn moves the horizontal floating lever 70 from right to left until such time as the brake shoes 90 engage the wheels 16. At this time the horizontal lever 70 is fulcrumed about the pin 76. Thus further extension of the piston rod 64 causes the opposite end 71 of horizontal lever 70 to move from left to right in FIG. 1 and in turn move the slack adjuster 106 from left to right. Since second horizontal lever 108 is fulcrumed at 116, left to right movement of slack adjuster 106 causes left to right movement of horizontal lever 108 and left to right movement of the brake beam assembly 78'. This results in engagement of the brake shoes 90' with the wheels 16'. This condition persists for as long as there is a reduction in pressure in the brake line 22 from the locomotive control valve.

When it is desired to release the brakes, the brake pipe pressure is recharged by means of the main reservoir in the locomotive. As the brake pipe pressure is restored above the reservoir pressure, the triple valve 30 setting is changed by the pressure differential. The triple valve is moved to direct release, allowing the cylinder pressure to exhaust to atmosphere as the reservoir 40 recharges. The bias of spring 68 then causes piston 64 to move from left to right in FIG. 1. This causes left to right movement of the horizontal lever 70 initially about the pivot point 76. This in turn causes slack adjuster 106 and horizontal lever 108 to move from right to left in FIG. 1. This releases the brake shoes 90' from the wheels 16'. Further movement of the piston rod 64 causes the brake shoes 90 to disengage from wheel 16 and causes the whole horizontal lever 70 to move from left to right in FIG. 1. The bias of spring 68 thus returns the brake beam assemblies 78, 78' to their disengaged position. In addition the triple valve causes fluid communication to exist between the trainline 22 and the reservoir 40 whereby the reservoir is recharged with air pressure from the locomotive.

Slack adjuster 106 is preferably provided with a horizontally extending slack adjuster lever 120. Slack adjuster lever 120 is connected at one end to a slack adjuster control rod 122 by means of a vertical pin 124. Generally at the mid-portion of the slack adjuster lever 120 another vertical pin 76 connects the slack adjuster lever with the first horizontal lever 70. The opposite end 128 of the slack adjuster lever is inserted into a slot 130 located in a slack adjuster fulcrum bracket 132 mounted by means of fasteners 134 on a vertical bracket 136.

When the brake shoes are new and there is little wear, slack adjuster lever 120 moves with horizontal lever 70 and does not bottom out within slot 130 in fulcrum lever 132. However, when wear occurs in the brake shoes, it takes more travel of piston rod 64 before the brake shoes engage the wheel. During right to left movement of piston 64 slack adjuster lever 128 bottoms out in slot 130.

Since the slack adjuster control lever 128 is pivoted at the brake beam connection 76 but restrained in the fulcrum slot 130, the control rod moves from right to left in proportion to the wear experienced. At the same time the slack adjuster 106 is moving from left to right in compression as the brakes are applied. The amount of piston overtravel is thus metered by the control linkage and transmitted to the slack adjuster mechanism through the control rod 122. This causes the slack adjuster to make adjustments to compensate for shoe and wheel wear which in turn restores the piston travel to the original setting.

It is to be noted, however, that slack adjuster 106 is under compression during application of the brakes, notwithstanding the adjustments which the tension applied to control rod 122 causes. Having the slack adjuster 106 under compression enables a single brake cylinder to apply brake force to brake beam assemblies which move in opposite directions to apply brake force, and control the application of this force in accordance with the wear that occurs on all four wheels.

Figure 8:
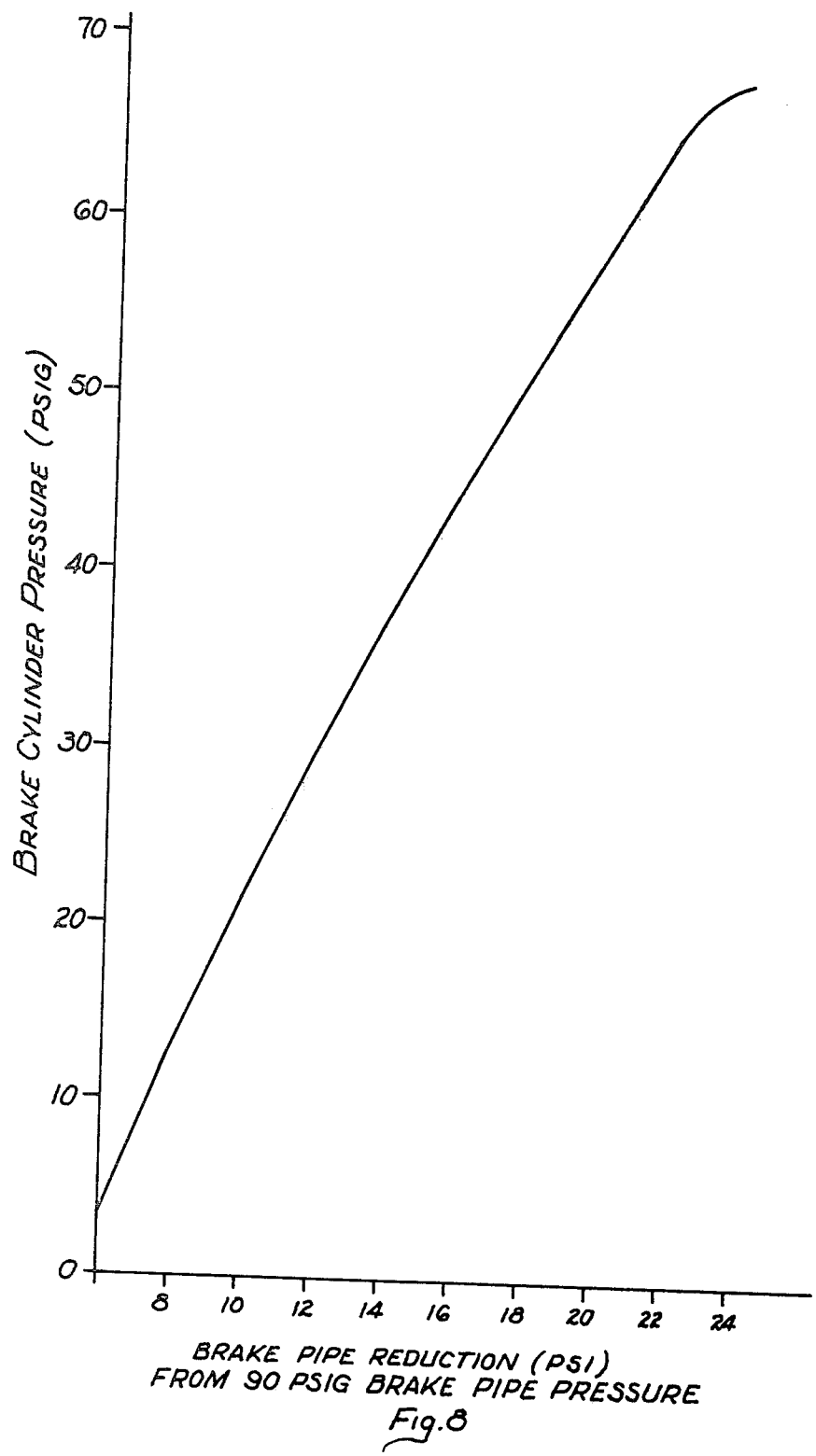
FIG. 8 is a plot of reduction in brake pipe pressure against brake cylinder pressure as the brakes are applied, illustrating the near linear relationship according to the data obtained in Example I.

A significant advantage of the brake system of the present invention is that a reduction in brake pressure at the locomotive will cause a related increase in pressure in the brake cylinder and hence a related increase in the brake application force applied to the brake shoes. While the relationship between the pressure drop in the trainline and the pressure in the brake cylinder and the brake application force is not linear, it is close to a linear relationship. See FIG. 8. This is particularly advantageous for unit train service where many mine cars and many gondola cars carrying ore or coal from one destination loaded and return from destination unloaded. The operator in the locomotive can cause a large pressure drop in the trainline when the cars are loaded and are going to the destination to be unloaded.

Due to the weight of the lading, higher retardation forces are required to balance or overcome the kinetic energy of loaded consits. However, in the unloaded condition the operator can make lesser brake pipe reductions resulting in lower application forces. This will furnish a similar rate of retardation as experienced with the loaded consist at greater brake pipe reductions. The above results in improved control of both loaded and unloaded consists with less damage to wheels and rails under light car condition causes by overbraking and sliding wheels.

In addition, the brake system can be charged to higher pressures than required for normal loaded operations. This affords a reservoir of air pressure at each car for emergency conditions or cycle braking.

Thus, for unit train service, the fact that the brake system of the present invention applies the brake force in proportion to the pressure drop in the brake pipe is a significant advantage.

The brake system of the present invention has been described in connection with a two-axle railway mine car. However, it is to be understood that the brake system of the present invention could be readily utilized in a conventional two-axle railway car truck. While adjustments in the dimensions of the slack adjuster 106 and the horizontal levers 70 and 80 would be required, the basic operation of the brake system would be the same. Of course, there would be a brake system as described herein above located below each truck in the railway car at each end of the car. However, the advantage that the pressure reduction at the locomotive causes a corresponding increase in brake application force would be present in such system. Since many conventional railway gondola cars are involved in unit train service, the advantage of this feature will be appreciated by those skilled in the art.

EXAMPLE I

Data was obtained on cylinder pressures and distances of piston travel at various brake pipe reductions from minimal reductions to full service application on one car.

The following procedure was utilized for testing and recording data.

A recently calibrated gage reading from 0 to 100 psig was installed at the brake pipe-to-cylinder connection at the cylinder.

With the test gate installed, the brake system was charged to 70 psig. The system was checked to assure there was no brake leakage with brakes applied or released. Minimal leakage past the packing cup (as evidenced by a slow bubble at the cylinder vent) with brakes applied was considered acceptable.

The data is found in the attached Table I.

TABLE I

| Brake Pipe Reduction | 1st Test Cylinder Pressure | 1st Test Piston Travel | 2nd Test Cylinder Pressure | 2nd Test Piston Travel | 3rd Test Cylinder Pressure | 3rd Test Piston Travel |
|---|---|---|---|---|---|---|
| 3 PSI  | 2  | 3⅜     | 3  | 2¾     | 3  | 2¾ |
| 6 PSI  | 7  | 5¾     | 5  | 5⅞     | 8  | 5⅞ |
| 8 PSI  | 13 | 6¼     | 14 | 6¼     | 15 | 6¼ |
| 10 PSI | 18 | 6⅝     | 20 | 6 9/16 | 20 | 6 11/16 |
| 12 PSI | 24 | 6¾     | 26 | 6 13/16| 28 | 6 13/16 |
| 14 PSI | 31 | 6 13/16| 38 | 6 13/16| 36 | 6 15/16 |
| 16 PSI | 38 | 6⅞     | 45 | 6⅞     | 44 | 6 15/16 |
| 18 PSI | 46 | 6 15/16| 50 | 6⅞     | 51 | 7 |
| 20 PSI | 52 | 7      | 53 | 6 15/16| 53 | 7 |
| 22 PSI | 52 | 7      | 53 | 6 15/16| 53 | 7 |
| 24 PSI | 52 | 7      | 53 | 6 15/16| 53 | 7 |

EXAMPLE II

Example I was repeated with a brake line charging pressure 90 psig.

Piston travel was not measured except as indicated below.

TABLE II

| Brake Pipe Reduction | 1st Test BCP | 2nd Test BCP | 3rd Test BCP |
|---|---|---|---|
| 3 PSI   | 0   |             |             |
| 3½ PSI  |     | 0 (2½" P.T.)| 0 (3" P.T.) |
| 6       | 4   | 4           | 4           |
| 8       | 14  | 12½         | 12½         |
| 10      | 22  | 21          | 22          |
| 12      | 29  | 29½         | 29½         |
| 14      | 37½ | 36          | 36½         |
| 16      | 44½ | 44½         | 43½         |
| 18      | 51  | 50½         | 51          |
| 20      | 58  | 58½         | 58          |
| 22      | 65  | 65          | 64½         |
| 24      | 68  | 68          | 68          |

Remarks:

Piston travel was 6" to 6¼" at 4 psi BCP and extended to 7" with 22 psi BCP.

Piston travel was 7⅝" at 51 psi BCP.

Maximum extension was 7⅝" at 68 psi BCP.

Equalization (max BCP) was 68 psi—BCP at 24 psi brake pipe reduction. Further reduction caused no change in the brake cylinder pressure.

What is claimed is:

1. A railway car brake system comprising:

a trainline connected to a triple valve; said triple valve also being in fluid communication with a fluid reservoir and a brake cylinder; said reservoir also being in fluid communication through said valve with said brake cylinder; said brake cylinder being fixedly mounted on the car and including a piston movable within said brake cylinder; said piston at its outer end connected to a first horizontal brake lever, extending transversely of the car; said first horizontal lever connected generally at its mid-point to a first brake beam; whereby when pressure in said brake line is lowered, said triple valve shifts and air pressure from said reservoir moves said piston outwardly, which in turn moves said first horizontal lever longitudinally and moves said brake beam shoes into engagement with first railway wheels, and whereby when said first brake beam engages said first wheels, said first horizontal lever is fulcrumed at its mid-connection point to said first brake beam; said first horizontal lever having an opposite end connected to a slack adjuster which extends longitudinally of the car; said slack adjuster connected at its opposite end to a second horizontal lever, said second horizontal lever having an opposite end fulcrumed to a fixed portion of the car; whereby after said first brake beam engages said first railway wheels, further outward movement of said piston rod pivots said first horizontal lever about said mid-connection point and moves said slack adjuster longitudinally of the car, and in turn pivots said second horizontal lever about its pivot point; and whereby said second brake beam moves longitudinally in a direction opposite to the movement of said piston rod to cause said second brake beam to engage second railway wheels; and whereby when the pressure is increased in said brake line to a specified level, said triple valve again shifts; the pressure in said brake cylinder is reduced; said piston rod moves from left to right which causes said second horizontal lever to move from right to left to cause said second brake beam to disengage and causes said first horizontal lever to move from left to right to cause said first brake beam to disengage.

2. A railway brake system according to claim 1 wherein the brake application force is controlled by the pressure drop applied to the train line, and wherein the greater the pressure drop in the train line, the greater the applied pressure in the brake cylinder and the greater the applied force to the brakes.

3. A railway brake system according to claim 2 including a horizontally extending slack adjuster lever pivotably connected to said first brake beam; said slack adjuster at its opposite end connected to a slack adjuster control rod.

4. A railway brake system according to claim 3 wherein said slack adjuster lever slides within a slot in a vertically extending fulcrum bracket; and whereby when at least one of said first and second brake beam shoes have worn to specified extent, said slack adjuster lever bottoms out in said fulcrum bracket; and whereby the longitudinal movement of said first horizontal lever pivots said slack adjuster lever about said vertical pin to apply tension to said slack adjuster control rod.

5. A brake system according to claim 1 wherein said first and second brake beams are horizontally extending and are supported for longitudinal horizontal movement by guide means engaging a surface of a center arm in said brake beams.

6. A railway brake system according to claim 1 wherein said first and second brake shoes are free to rotate about a horizontal axis and include an extension having a slot whereby said brake shoes are adjustable by means of a fastener extending through said extension, and a vertical support having a slot.

7. A brake system according to claim 5 wherein said guide means comprise a guide mounted upon a vertical support attached to the car body.

8. A railway car brake system comprising:
a trainline connected to a triple valve; said triple valve also being in fluid communication with a fluid reservoir and a brake cylinder; said reservoir also being in fluid communication through said valve with said brake cylinder; said brake cylinder being fixedly mounted on the car and including a piston movable within said brake cylinder; said piston at its outer end connected to a first horizontal brake lever, extending transversely of the car; said first horizontal lever connected generally at its mid-point to a first brake beam; whereby when pressure in said brake line is lowered, said triple valve shifts and air pressure from said reservoir moves said piston outwardly, which in turn moves said first horizontal lever longitudinally and moves said brake beam shoes into engagement with first railway wheels, and whereby when said first brake beam engages said first wheels, said first horizontal lever is fulcrumed at its mid-connection point to said first brake beam; said first horizontal lever having an opposite end connected to a slack adjuster lever which extends longitudinally of the car; said slack adjuster connected at its opposite end to a second horizontal lever, said second horizontal lever having an opposite end fulcrumed to a fixed portion of the car; whereby after said first brake beam engages said first railway wheels, further outward movement of said piston rod pivots said first horizontal lever about said mid-connection point and moves said slack adjuster longitudinally of the car, and in turn pivots said second horizontal lever about its pivot point; and whereby said second brake beam moves longitudinally in a direction opposite to the movement of said piston rod to cause said second brake beam to engage second railway wheels; and whereby when the pressure is increased in said brake line to a specified level, said triple valve again shifts; the pressure in said brake cylinder is reduced; said piston rod moves from left to right which causes said second horizontal lever to move from right to left to cause said second brake beam to disengage and causes said first horizontal lever to move from left to right to cause said first brake beam to disengage; said brake application force being controlled by the pressure drop applied to the train line, and wherein the pressure applied to the brakes is approximately linear with the pressure drop applied to the train line.

* * * * *